Patented Dec. 10, 1940

2,224,237

UNITED STATES PATENT OFFICE 2,224,237

COMPOSITION AND METHOD OF MAKING SAME

Donald H. Spitzli, Arlington, and Reeves L. Kennedy, Plainfield, N. J., assignors to Congoleum-Nairn Inc., a corporation of New York No Drawing. Application November 11, 1936, Serial No. 110,303

5 Claims. (Cl. 106—7)

This invention relates to composition and method of making same. It relates especially to compositions comprising a binder material interspersed with a filler material.

Features of this invention relate primarily to the character and properties of the filler material that is interspersed in a binder such as a linoleum cement, a soluble cellulose derivative, chlorinated rubber, synthetic resin, pitch, or the like.

It is a purpose of this invention to afford compositions comprising a binder, e. g. a binder of the character aforesaid and a filler material which compositions have novel properties and embody improvements in various respects upon compositions heretofore made and sold.

In order to afford an understanding of this invention and the purposes, features and advantages thereof, it will be described for the purpose of illustration in connection with linoleum composition and the manufacture thereof.

Linoleum composition, as heretofore generally manufactured, comprises a so-called linoleum "cement" consisting substantially of oxidized oil and resinous material, interspersed with an organic filler such as wood flour or ground cork and a mineral filler such as whiting, lithopone, ochre, etc. The mineral filler usually includes pigments selected in suitable amount and color to give a desired shade to the finished product. A typical example of a linoleum composition is as follows:

| | Per cent |
|---|---|
| Linoleum cement | 30 to 40 |
| Wood flour | 30 to 35 |
| Mineral filler and pigments | 40 to 25 |

The linoleum cement usually comprises about 65 to 85% of oxidized oil and 15 to 35% of resinous material. The oil which is generally employed in making linoleum cement is linseed oil.

The preparation of linoleum cement is very well known and detailed reference thereto is not regarded as necessary herein. It may be mentioned, however, that there are two methods commonly used for making linoleum cement. According to one method a boiled linseed oil is trickled over cloth in oxidizing houses while exposed to air at about 100° to 140° F. until a body of coagulated oil is built up which is of desired thickness. This coagulated oil is subsequently fluxed with resinous material such as rosin, Kauri gum, or the like to form the cement. According to the second process an oil-resin mixture is oxidized at elevated temperatures, e. g., from about 140° F. to about 270° F. in a drum provided with an agitator, air being blown into the mixture and agitation being continued until an elastic semi-solid material is obtained.

In making linoleum composition a linoleum cement, such as a cement of the character aforesaid, is mixed with filler materials and the resulting linoleum composition can be molded in any suitable way and, if desired, deposited on a suitable backing to produce covering materials suitable for floors, walls and the like. The linoleum composition, after preparation and molding, is then seasoned to toughen and harden it. The seasoning usually is caused to take place at elevated temperature, e. g., from about 160° F. to 180° F. and usually requires several weeks.

For use in coverings for floors, walls and the like, linoleum composition should have such properties as flexibility, resiliency, resistance to abrasion, and resistance to soiling. Resistance to soiling is especially important in connection with floor coverings. Resistance to soiling can be improved by increasing the proportion of mineral filler in linoleum composition. However, the amount of mineral filler which can be used in commercially satisfactory linoleum of the type heretofore manufactured, is limited inasmuch as increase in the amount of mineral filler results in decrease in the flexibility, resiliency, good working properties and resistance to abrasion of the linoleum composition.

By the employment of this invention in connection with linoleum composition, the soil resistance of linoleum composition can be greatly increased while still retaining (and in preferred practice, while actually improving upon) the flexibility, resiliency, working properties and abrasive resistance of the linoleum composition.

It is a feature of this invention that the filler material interspersed in the binder comprises a specially prepared linoxyn having certain characteristics the nature of which is described more in detail below. By linoxyn reference is made to the product of oxidation and coagulation of a drying or semi-drying oil, after the oil has been transformed from a liquid to a solid state. While linoxyn denotes a drying oil which has been transformed to a solid state, linoxyn not only contains coagulated constituents of the original oil but also certain uncoagulated constituents of the original oil. In the making of linoleum cement a linoxyn is formed which, when commingled with a resinous material, is of a sticky and gelatinous character. According to the present invention, compositions of a novel and most advantageous character are afforded by utilizing as part or all of the filler material a highly coagulated and dry linoxyn which instead of being availed of as a binder medium is availed of as a filler material in the form of finely-divided discrete particles which consist substantially of or comprise said linoxyn. From one aspect, it is a feature of this invention that a linoxyn is employed as a filler material for dispersion in discrete particles in a binder which linoxyn has the property of being at least about 80% insoluble in ethyl ether. Insolubility is determined by extraction for twenty-four hours with ethyl ether in a Soxhlet extraction apparatus. Preferably the linoxyn which is employed in the practice of this invention is at least about 85% insoluble in ethyl ether.

Highly coagulated linoxyn of the character above mentioned has extraordinary properties as a filler material when interspersed in finely-divided condition in a binder. This may be illustrated in connection with linoleum composition. Thus by the use in linoleum composition of only about 6 to 15%, for example, of filler of this character, a linoleum composition suitable for flooring, for example, is obtainable which has much improved soil resistance and at the same time has a high degree of pliability, resilience, and resistance to abrasion.

The increase in soil resistance that is afforded by using highly coagulated linoxyn as a filler appears to be the result of several factors. In the first place, it has been found that such linoxyn filler particles have to a high degree, an inherent resistance to soiling, the soil resistance thereof being much greater than that of vegetable fillers such as wood flour and ground cork. Consequently, when linoxyn filler particles are substituted for all or part of the vegetable filler which is generally employed in linoleum composition, the soil resistance of the linoleum composition is definitely increased. The use of the linoxyn filler particles contributes to increased soil resistance of linoleum composition in other ways as well. Thus such filler particles have been found to be less absorptive of linoleum cement than the vegetable and mineral fillers customarily used, thereby permitting the use of a decreased quantity of linoleum cement and a corresponding decreased amount of those ingredients of linoleum cement which are particularly susceptible of soiling such as resinous material and unhardened oil constituents. Moreover, the addition of such linoxyn filler particles has the unexpected result of decreasing the harmful effects of those resinous materials and unhardened oil ingredients which remain in the linoleum cement that is used.

When linoxyn filler particles of the character aforesaid are employed, it is not necessary to reduce the amount of mineral filler. On the contrary, substantially greater quantities of mineral filler can be employed than has been regarded as practical heretofore without sacrificing the working properties and flexibility and resiliency of the linoleum composition. The use of increased quantities of mineral filler which is permitted because of the presence of the linoxyn filler particles further contributes to the increased soil resistance that can be obtained when such filler particles are employed in linoleum composition in the practice of this invention.

The linoxyn filler particles of the character aforesaid, while non-sticky and dry appearing, nevertheless possess such elasticity and resiliency that the employment thereof affords a linoleum composition which is highly flexible and resilient. Even when the mineral filler content is increasd so as to be greater than in ordinary present day linoleums (thus tending to make the linoleum more rigid and brittle), the incorporation of linoxyn filler particles permits the production of a linoleum composition which is considerably more resilient and flexible than those which are manufactured at the present time. The imparting of increased flexibility and resiliency makes the linoleum composition better suited for use in floor coverings, for example, as the linoleum composition is rendered much more resistant to cracking, chipping, abrasion and the like. Moreover, since the use of linoxyn-containing filler particles tends to impart decreased thermoplasticity to a linoleum composition, a linoleum composition including such filler particles has good working properties even when an abnormally great amount of mineral filler is also present.

It is also significant that the employment of linoxyn filler particles of the character aforesaid is of value in preventing gradual hardening and embrittlement of linoleum composition after it has been made. Ordinary linoleum composition shows progressive hardening and loss of pliability and resiliency upon aging. For example, an ordinary linoleum composition, such as the linoleum composition above illustrated, when first produced exhibited a dent, which is a measure of hardness and resiliency, of 29% of its thickness under 200 lbs., (using a .282" diameter cylinder applied for one minute) but after ten and one-half months exhibited a dent of only 18%. By way of comparison, when a linoleum composition containing 10% of linoxyn filler particles (instead of a corresponding amount of wood flour), which linoxyn was derived from China-wood oil (hereinafter referred to as "wood oil") and which was over 85% insoluble in ethyl ether, was subjected to a similar test after a similar interval of time, the percentage dent was merely reduced from 29% to 22%. In a similar manner when 20% of such linoxyn filler particles was used, the percentage dent merely changed from 30% to 25%.

It is of still further advantage that the employment of linoxyn filler particles of the character aforesaid, according to this invention, enables linoleum composition to be produced which has decreased water absorption and decreased expansion due to moisture. One of the objectionable features of linoleum composition is the tendency of such compositions to swell under damp or humid conditions and to shrink when dried out again. This swelling and shrinking is harmful especially in linoleum installations of substantial size.

In order to enable one to readily practice this invention, a preferred method will be described whereby linoxyn filler material having desired characteristics may be prepared. Wood oil with or without a drier such as lead or cobalt is heated at a temperature of about 350° to 450° F. with agitation but with no attempt at aeration until it gels to a light jelly-like consistency. It is then cooled rapidly to room temperature to prevent further reaction. The product at this point may vary considerably in consistency and character but it is preferred to work with a gelled oil which has an insolubility in ethyl ether of from about 40% to about 50%. The gelled oil is then kneaded and worked in a suitable apparatus provided with an agitator while maintained at about 200 F. to about 280° F. The kneading is carried out in the presence of air in order to hasten the action. During this operation the oil oxidizes and polymerizes until it becomes a white crumbling, powdery mass. The mass is then cooled, while continuing the agitation to break up the mass as much as possible. The resulting linoxyn has an insolubility in ethyl ether of about 90% or more. To prepare the linoxyn for use as a filler material the linoxyn is ground as by passing it between grinding rolls set closely together.

In the preparation of linoxyn to be used as a filler, it is preferable to employ an oil or oil mixture which is capable of attaining a high degree of coagulation as evidenced by its insolubility in ethyl ether. Wood oil has this property. Oiticica oil also has this property. Thus when oiticica oil is treated as above described, the resulting linoxyn is usually about 88% insoluble in ethyl ether. When wood oil (or oiticica oil) is blended with other oils and treated as above described, the composite linoxyn has a greater proportion of ethyl ether insoluble material than if the two oils were treated separately and the resulting linoxyns thereafter mixed. Thus in the preparation of linoxyn to be used as filler, it is preferable to employ an oil such as wood oil or oiticica oil either alone or mixed with some other drying oil such as linseed oil, perilla oil, soya bean oil or fish oil. For example, by the use of two parts of wood oil and one part of linseed oil a linoxyn can be obtained which is 90% insoluble in ethyl ether. A mixture of 3 parts of wood oil and 1 part of fish oil or perilla oil gives a linoxyn which is about 85% insoluble in ethyl ether. When an oil such as linseed oil is treated alone, the maximum insolubility in ethyl ether that can be attained without loss of resilience and discoloration of the oil is about 80%. This degree of insolubility in ethyl ether can be attained more readily by mixing wood oil or oiticica oil with the linseed oil during the oxidation and coagulation of the oil. When the insolubility of the oil in ethyl ether drops below about 80% it has been found that the suitability of the linoxyn as a filler material is greatly lessened. For preferred results, the linoxyn should have an insolubility in ethyl ether of about 85% or more.

In the preparation of linoxyn having high insolubility in ethyl ether, by coagulation and oxidation of an oil it is not essential that the procedure described above by way of example be followed. Thus it is not essential to preliminarily subject the oil to heating without aeration, as the oil can, in the preliminary stages of treatment, be subjected to combined heating and aeration. In fact, when a substantial proportion of some oil such as linseed oil is used, aeration substantially promotes the preliminary coagulation of the oil. If, however, the oil is initially subjected to aeration as by blowing, the blowing should take place at a temperature somewhat lower, e. g., at about 200° to about 260° F. than when the oil is gelled by heat alone. If desired, the entire operation of coagulating and oxidizing the oil can be carried out in the mixer in which the ultimate linoxyn is formed, but such procedure would require a longer time within which to attain the desired product.

When a linoxyn has been produced by coagulation and oxidation of an oil until it is 80% (preferably 85%) insoluble in ethyl ether, it is of a dry appearing, tough and rubbery, nature. When the linoxyn in the form of finely divided particles is interspersed in a binder such as the binders above mentioned, the particles remain in discrete form and distinct from the binder. By mixing the linoxyn particles with such binders, with or without the addition of other fillers, a variety of useful compositions is afforded.

In the manufacture of linoleum composition, the linoxyn filler particles may be mixed with the linoleum cement instead of or in addition to the usual linoleum fillers and in the same manner that ordinary linoleum fillers are interspersed in linoleum cement. The resulting linoleum composition can then be molded and seasoned as in the manufacture of floorings and other covering materials. While the linoleum cement contains oxidized oil, the proportion of uncoagulated oil constituents (as evidenced by the ethyl ether solubility test) in the oxidized oil component of the cement is substantially greater than the proportion of uncoagulated oil components in the linoxyn filler particles. In this connection, ordinary oxidized oil produced by the methods heretofore used for making linoleum cement rarely exceeds 60% insolubility in ethyl ether. Moreover, as the linoxyn filler particles are prepared from oil substantially free of resinous material, the filler particles are likewise substantially free of resinous material. The freedom of the filler particles from resinous material is one of the factors which as aforesaid contribute to the soil resistance of the linoleum composition, comprising the linoxyn filler particles. While it is not beyond the scope of this invention to combine some resin with the linoxyn in the filler particles, it is preferable that the proportion of resinous material comprised in the filler particles be substantially less than the proportion of resinous material in the linoleum cement in which the filler particles are dispersed.

In the manufacture of linoleum composition, the finely-divided linoxyn filler preferably replaces a substantial amount of the vegetable filler such as the wood flour or ground cork which is used in ordinary linoleum compositions especially when increase in soil resistance is desired. When all or a major proportion of the filler is in the form of linoxyn a highly elastic and rubbery linoleum composition can be obtained. For example, a lineleum composition containing thirty-three parts of linoleum cement and sixty-seven parts of powdered linoxyn (using only sufficient dye or pigment to produce the desired color) is extremely rubbery, resilient and flexible as compared with a linoleum composition containing a similar quantity of filler of ordinary character such as wood flour, ground cork or mineral pigments. Advantages of this invention are likewise attained when only a small proportion of the linoxyn filler particles is incorporated. For example, when linoleum composition contains about 6% or more of linoxyn of the character aforesaid disposed in discrete filler particles, pronounced benefits are attained. When only relatively small amounts of the linoxyn filler particles are employed it is preferable, in attaining a high degree of soil resistance to employ less than 10% of filler material other than the linoxyn or mineral filler material. When about 50% to about 85% of the filler material is mineral filler and a major proportion of the filler other than mineral filler is linoxyn of the character aforesaid, linoleum composition having a high degree of soil resistance and, at the same time, satisfactory flexibility and resiliency is secured. It is preferable that the total amount of filler be at least about 60% to about 80% of the linoleum composition.

In the manufacture of linoleum composition intended for flooring and designed to have high soil resistance combined with resiliency and flexibility, the following materials in the following relative proportions have been found especially desirable:

|  | Per cent |
|---|---|
| Linoleum cement | 22 to 30 |
| Powdered linoxyn | 8 to 15 |
| Wood flour | 7 to 5 |
| Mineral filler | 62 to 57 |

Certain specific embodiments of this invention, together with the results of tests comparing the new linoleum composition with linoleum of ordinary character, are shown in the following tables:

|  | Composition including China-wood linoxyn | Composition including linseed linoxyn | Ordinary linoleum composition |
|---|---|---|---|
| Linoleum cement percent by weight | 21.9 | 21.9 | 32.0 |
| China-wood linoxyn (90% insoluble in ethyl ether) | 8.7 | | |
| Linseed linoxyn (80% insoluble in ethyl ether) | | 8.7 | |
| Wood flour | 6.5 | 6.5 | 31.2 |
| Whiting | 24.3 | 24.3 | 14.3 |
| Lithopone | 38.6 | 38.6 | 22.5 |
|  | 100.0 | 100.0 | 100.0 |
| Soil resistance | Very high | High | |
| Resiliency increased percent | 15 | 15 | |
| Pliability increased percent | 25 | 25 | |
| Elongation under tension increased percent | 25 | 25 | |
| Water absorption decreased percent | 70 | 50 | |
| Expansion due to moisture decreased percent | 50 | 50 | |
| Alkali resistance increased percent | 25 | None | |
| Color | Whiter | Same | |
| Seasoning time increased percent | None | 50 | |

In the foregoing table the different properties of the linoleum compositions were determined as follows:

*Seasoning.*—Period necessary to lower indentation under a 200 lb. weight applied on a .282" diameter cylinder for one minute, to 30% of the overall thickness of linoleum.

*Resiliency.*—The per cent of the indentation that recovers to its original position within a period of one minute after the 200 lb. weight is removed in the seasoning test.

*Pliability.*—The angle of flexure from the horizontal obtained in a one minute period by putting a 12 inch by 3 inch sample on a $\frac{9}{16}$" mandrel, transversely and centrally, and weighting the ends with 100 gram weights.

*Elongation under tension.*—The percentage stretch of a sample of 1 inch square cross section at the breaking point under gradually increasing tension.

*Humidity effect.*—Grams of water absorbed by a sample 6"x6"x.1" in eight days at 85% humidity from an initial bone dry condition; and the per cent dimensional increase in the cross direction under the same conditions.

*Alkali resistance.*—The depth which 2 cc. of 5% water solution of sodium hydroxide will etch in one hour acting on a constant area.

Referring to the foregoing table, it is apparent that the advantages of the novel compositions comprising this invention are many. There is not only great improvement in soil resistance but also decided improvement in such desirable properties as resiliency, pliability, elongation under tension (freedom from excessive "shortness"), and resistance to water absorption and swelling due to moisture. Moreover, it is to be noted that substantially less linoleum cement is required than in the usual type of linoleum composition to give equally good working characteristics. Since the amount of linoleum cement is thus reduced, the use of filler particles comprising linoxyn does not necessitate a substantial increase in the oxidized oil component of the linoleum composition as a whole.

The results set forth in the foregoing table indicate further that linoxyn filler particles prepared from linseed oil have the property of substantially increasing the time within which seasoning of linoleum composition may be accomplished, whereas linoxyn prepared from wood (or oiticica oil) does not have this property. When shorter seasoning time is desired, linoxyn prepared from wood oil or oiticica oil, or a mixture of these oils with a drying or semi-drying oil, is therefor preferable. As is likewise evidenced by the results set forth in the foregoing table, linoxyn prepared from wood oil or oiticica oil, or from a mixture of such oils with other drying or semi-drying oil, is likewise preferable because of the resulting increased alkali resistance.

As aforesaid, linoxyn filler particles may be employed in the practice of this invention, which particles consist substantially of linoxyn. However, many of the advantages of this invention may be realized even though the filler particles are not composed wholly of linoxyn. For example, if 10% of rosin is added to an oil, such as wood oil, and the oil-rosin mixture is oxidized and coagulated as aforesaid, a product can be obtained which is highly insoluble in ethyl ether and which contains linoxyn at least 80% or more of which is insoluble in ethyl ether. In such a product, the filler particles are of substantially uniform consistency throughout. Other resinous materials, such as alkyd resins or synthetic resins of the oil-soluble phenol-aldehyde type, may also be employed. In the preparation of linoleum composition which is intended to have high soil resistance, however, resinous material is preferably omitted from the filler particles because, as aforesaid, resinous materials, especially natural resins and gums, are relatively susceptible to soiling when incorporated in linoleum composition.

In the preparation of filler particles which are of substantially uniform composition throughout, other materials than resinous materials may also be incorporated with the linoxyn, e. g., chlorinated rubber. In such cases where linoxyn is combined with some material other than linoxyn in filler particles of uniform consistency throughout, the linoxyn component should preferably constitute the major proportion of such filler material.

Instead of preparing linoxyn filler particles which consist substantially of linoxyn of the character herein mentioned or such linoxyn combined with some other substance and which are of substantially uniform consistency throughout, such linoxyn or linoxyn mixtures of uniform consistency may be carried by other filler materials, as by being coated on vegetable or mineral filler materials or both, in the manner set forth in my application, Serial No. 110,304, filed November 11, 1936, for Composition and method of making same.

While particular reference has been made herein to linoleum compositions and the manufacture thereof, this has been done primarily to afford one illustration of the practice of this invention. As hereinabove mentioned, filler particles comprising linoxyn of the character aforesaid can be interspersed in other binder materials than linoleum cement. For example, such filler particles can be interspersed in a bituminous binder such as pitch. A composition comprising about 25% pitch having a softening point of about 150° F., about 50% of mineral filler, and about 25% of linoxyn prepared from a mixture of wood oil and linseed oil and about 85% insoluble in ethyl ether, is suitable for industrial flooring and is notable for its high degree of pliability, resiliency and soil resistance.

Filler particles comprising linoxyn of the character herein mentioned may also be incorporated in soluble cellulose derivatives such as cellulose ethers (e. g., ethyl cellulose, benzyl cellulose, etc.) and cellulose esters (e. g., cellulose nitrate, cellulose acetate, etc.). For example, a composition containing 19% of cellulose nitrate and plasticiser, 34% of mineral filler, and about 47% of linoxyn prepared from tung oil and about 90% insoluble in ethyl ether, can be used for purposes similar to the purposes to which lineloum composition is put. In this case also the composition was found to have greater pliability, resiliency and soil resistance than similar compositions using ordinary fillers, such as wood flour, ground cork, or the usual mineral fillers.

Chlorinated rubber of 60-70% chlorine content with suitable plasticiser or softener may also be used as a binder for a composition containing filler particles of linoxyn. For example, a composition containing chlorinated rubber 25 parts, blown castor oil 6 parts, tricresyl-phosphate 19 parts, cork flour 18 parts, ochre 13 parts, and linoxyn prepared from tung oil and about 90% insoluble in ethyl ether 19 parts, is suitable for floor covering and has superior pliability and resiliency to a similar composition where cork is substituted for the linoxyn.

Other binder materials may also be employed in which filler particles are dispersed comprising linoxyn of the character herein described. Thus, resinous binders may be employed such as the synthetic alkyd resins or resins of the phenol-aldehyde type. For example, molded articles may be made comprising phenol-aldehyde resins as binder and filler particles of linoxyn. A useful composition may comprise 50 parts of phenol-aldehyde molding powder, 15 parts lithopone, and 35 parts of linoxyn prepared from tung oil and about 90% insoluble in ethyl ether.

Enamels and paints may also be formulated with filler particles of linoxyn. Thus an enamel may be made comprising 100 parts of an enamel vehicle, 45 parts zinc oxide, 45 parts lithopone, and 10 parts linoxyn prepared from tung oil and about 90% insoluble in ethyl ether. Such an enamel shows superior hardness and flow characteristics.

The use of ground seasoned scrap linoleum composition of ordinary type as a filler ingredient of linoleum is well known in the art. The binder which has hardened on the particles of vegetable and mineral filler in such scrap is, however, less than 80% insoluble in ethyl ether, and usually is only about 60% insoluble. Such ground linoleum scrap, therefore, is deficient in the characteristic insolubility obtained in the filler particles of the present invention and in addition includes considerable resinous material. Using such ground scrap one cannot obtain a linoleum composition having the flexibility, resilience and soil resistance which can be obtained in the practice of this invention.

While this invention has been described in connection with certain illustrative embodiments thereof, it is to be understood that this has been done merely for the purpose of affording illustrations thereof and that the scope of this invention is to be limited only by the language of the following claims.

We claim:

1. A method of making a composition suitable for linoleum or the like which comprises subjecting to oxidation and coagulation a drying or semi-drying oil to form a product comprising linoxyn which is at least 80% insoluble in ethyl ether, said product being produced in the form of finely-divided particles of a dry, non-adherent character, making a moldable binder including a resinous material and an oxidized drying or semi-drying oil, distributing said particles in discrete form as a filler through the binder to form a moldable composition, and seasoning the composition.

2. A method of making a composition suitable for linoleum or the like which comprises subjecting to oxidation and coagulation drying or semi-drying oil comprising an oil selected from the group consisting of China-wood oil and oiticica oil to form a product comprising linoxyn which is at least 80% insoluble in ethyl ether, the said product being produced in the form of finely-divided particles of a dry, non-adherent character, making a moldable binder including resinous material and an oxidized drying or semi-drying oil containing substantially less than 60% of ethyl ether insoluble material, distributing said particles in discrete form in said binder to form a moldable composition, and seasoning the composition.

3. A method according to claim 2 wherein the drying or semi-drying oil used in producing said filler particles is composed predominantly of an oil selected from the group consisting of China-wood oil and oiticica oil and is oxidized and coagulated until at least 85% is insoluble in ethyl ether.

4. A method of making a composition suitable for linoleum or the like which comprises subjecting to oxidation and coagulation a material consisting chiefly of drying or semi-drying oil comprising an oil selected from the group consisting of China-wood oil and oiticica oil to form a product comprising linoxyn which is at least 80% insoluble in ethyl ether, said product being produced in the form of finely-divided, dry, non-adherent particles, making a moldable binder containing about 15 to 35% of a resinous material and about 65 to 85% of an oxidized drying or semi-drying oil containing substantially less than 60% of ethyl ether insoluble material, said particles containing substantially less resinous material than said binder, distributing said particles in discrete form in said binder to form a moldable composition, and seasoning the composition.

5. A method according to claim 4 wherein said filler particles are produced by oxidizing and coagulating a homogeneous mass to produce filler particles of uniform characteristics throughout containing said linoxyn.

DONALD H. SPITZLI.
REEVES L. KENNEDY.